United States Patent [19]

Hamabe et al.

[11] Patent Number: 4,561,326

[45] Date of Patent: Dec. 31, 1985

[54] FRICTION DRIVE PLANETARY ROLLER TYPE SPEED REDUCER

[75] Inventors: Takafumi Hamabe, Hikone; Hirozo Imai, Hirakata; Hikoyoshi Hara, Shijonawate, all of Japan

[73] Assignee: Matsushita Electric Works, Ltd., Osaka, Japan

[21] Appl. No.: 642,798

[22] Filed: Aug. 21, 1984561326231003742O6

[51] Int. Cl.[4] ............................................. F16H 13/06
[52] U.S. Cl. .......................................... 74/798; 74/206
[58] Field of Search ................. 74/798, 755, 796, 772, 74/690, 721, 204, 206, 208, 801; 403/202, 273; 29/447

[56] References Cited

U.S. PATENT DOCUMENTS

| | | | |
|---|---|---|---|
| 747,016 | 12/1903 | Lindquist et al. | 74/798 |
| 1,737,997 | 12/1929 | Garrard | 74/798 |
| 1,811,921 | 6/1931 | Edmunds | 74/798 |
| 2,528,470 | 10/1950 | Elder | 74/798 |
| 3,682,020 | 8/1972 | Scheiter | 74/772 |
| 3,848,476 | 11/1974 | Kraus | 74/206 |
| 3,889,554 | 6/1975 | Sinclair et al. | 74/798 |
| 4,052,915 | 10/1977 | Kraus | 74/206 |
| 4,060,010 | 11/1977 | Heden | 74/798 |
| 4,249,431 | 2/1981 | Pruvot | 74/785 |
| 4,366,727 | 1/1983 | Jonsson | 74/801 |
| 4,422,351 | 12/1983 | Kraus | 74/206 |
| 4,454,788 | 6/1984 | Kraus | 74/798 |

Primary Examiner—Rodney H. Bonck
Assistant Examiner—David Novais
Attorney, Agent, or Firm—Stevens, Davis, Miller & Mosher

[57] ABSTRACT

A speed reducer device having a rotatably driven input shaft, a plurality of elongated planetary rollers disposed around the axis of the rotatably driven input shaft, a plurality of cylindrical output connection rings coaxial with the input shaft and within which the planetary rollers are positioned, and means to press the rotatably driven input shaft, the planetary rollers, and the cylindrical output connection rings together so that when the input shaft is rotated, the planetary rollers and the connection rings rotate without slipping. Each planetary roller is formed from first and second coaxial integral rollers which revolve and rotate within the space defined by the rotatably driven input shaft and the cylindrical output connection rings. The output connection rings comprise first and second output connection rings, wherein the first and second rollers rotate and revolve within the first and second output connection rings, respectively. The pressing means is adjustable to press either the first output connection ring, the first roller, and the input shaft together or the second connection ring and the second roller together, whereby the rotation of the input shaft causes the planetary rollers and either the first or second connection rings respectively to rotate.

4 Claims, 15 Drawing Figures

FRICTION DRIVE PLANETARY ROLLER TYPE SPEED REDUCER

This is a division of application Ser. No. 470,931 filed Mar. 1, 1983.

BACKGROUND OF THE INVENTION

This invention relates to a speed reducer which can be used in conjunction with the driving unit for the massage member of a massager, a car motor, a car transmission, or a clutch means for an electric motor. The speed reducer of the present invention is particularly useful in place of reduction gears when a large speed reduction ratio is required.

The most common type of speed reducer utilizes gears, especially in situations where a large reduction gear ratio is required and multi-stage gears, worm gears, planetary gears, or harmonic speed changers cannot be utilized. These gears, however, are very noisy and have a restricted reduction gear ratio due to limitations in the gear teeth. The restricted reduction gear ratio makes it difficult or impossible to obtain desired gear ratios and reduces the efficiency of power transfer. Rolling transmission speed reducers, which are driven by friction or traction and have rollers or balls in a planetary gear system, have been widely utilized because they are quieter. An example of such a rolling transmission speed reducer is disclosed in U.S. Pat. No. Re. 26,978.

Figure 12A:
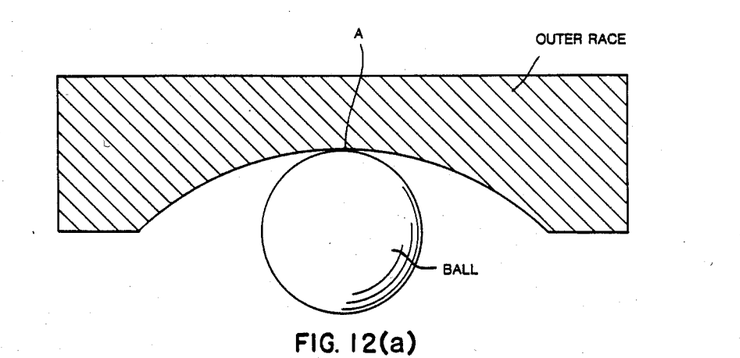
FIGS. 12a and 12b show a ball and outer race in contact with each other in prior art speed reducer devices.
Figure 12B:
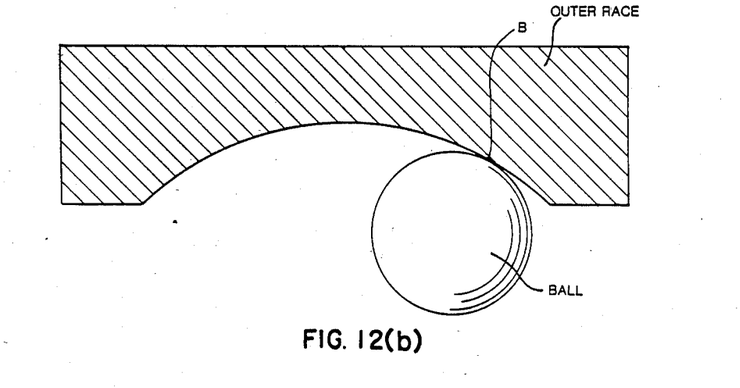

The acceleration/deceleration mechanism disclosed in U.S. Pat. No. Re. 26,978 does, however, have the following drawbacks:

1. The rollers or balls only contact the inner and outer races at points and this small area of contact causes the allowable contact pressure and the transferred torque to be low. 2. A differential slip is created between the balls or rollers and the inner and outer races which causes large torque and friction losses. FIG. 6 of U.S. Pat. No. Re. 26,978 shows the arrangement of the ball within the races. Among a plurality of balls within the races, some will contact the race at point A, as shown in FIG. 12a of the present invention, while others will contact the race at point B, as shown in FIG. 12b of the present invention. When the point of contact varies in this way, the circumferential speed of the ball at point A is different from that of a ball at point B and slipping consequently results.

3. The low transfer torque limits the deceleration/acceleration ratio even further so that it is only 1 to 10.

SUMMARY OF THE INVENTION

In light of the above problems the present invention has been designed. An object of the invention is to provide a speed reducer which is small, has a large reduction gear ratio, operates quietly, has a small backlash, and transfers power in a highly efficient manner.

This invention uses rollers in a planetary system, wherein each of the planetary rollers comprises a first and a second roller rotating and revolving integrally with each other on a common axis. The first and second rollers each have a different diameter and are arranged so that the planetary roller is positioned within a pair of output rings and the first and second rollers are pressed against each other. One of the rollers is also pressed against an input shaft so that if one of the output rings prevents the rotation of the roller, it is possible to obtain a larger reduction gear ratio from the other output ring due to the differential motion.

DETAILED DESCRIPTION OF THE DRAWINGS

FIGS. 1-4 show a first embodiment of the speed reducer in accordance with the present invention. Input shaft 1 is a sun roller around which a plurality of planetary rollers 3 are equidistantly spaced. Each of the planetary rollers 3 are supported at both axial ends in radial grooves 21. These radial grooves 21 are provided in carrier 2 which is freely rotatable with respect to input shaft 1. Each of the planetary rollers comprises rollers 32 and 34, which have equal diameters, and a roller 33, which has a different diameter. Rollers 32, 33, and 34 are all integral and coaxial with each other. Rollers 32 and 34 are positioned at both axial end portions of planetary roller 3 and roller 33 is sandwiched between rollers 32 and 34. An output ring 4 is disposed coaxially with input shaft 1 adjacent the outer periphery of roller 32, while an output ring 5 is disposed adjacent the outer periphery of roller 33, wherein output ring 5 has a smaller diameter than output ring 4. Output connection rings 6 and 7, each provided with gear teeth, are disposed at the outer peripheries of output rings 4 and 5 respectively. The output connection rings 6 and 7 screw together at their axial end while disc-shaped control elements 8 cover both axial ends of the planetary rollers 3. Output rings 4 and 5 both are formed from springs having a U-shaped cross section which has a width larger at the open end of the U than at the trough of the U. Output rings 4 and 5 are inserted in grooves formed between the control elements 8 and the output connection rings 6 and 7 so that the control elements 8 screw forwardly to axially compress and reduce the inner diameters of the output rings 4 and 5. Consequently, the output ring 4 is pressed against roller 32 so that rollers 32 and 34 press against input shaft 1 while, output ring 5 presses against roller 33. As shown in FIG. 4b, the contact pressure P, which is proportional to the axial displacement of the respective output rings 4 and 5 caused by the axial movement of each control element 8, is easily adjusted to achieve the necessary output torque.

Figure 1:
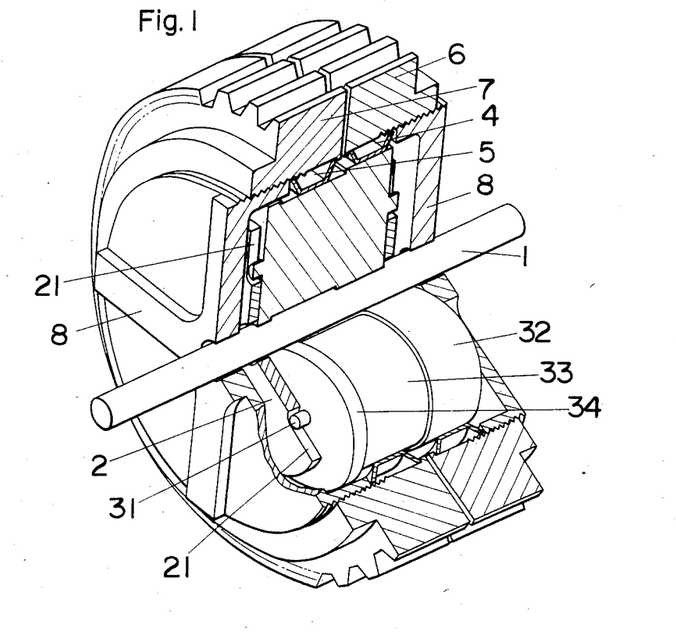
FIG. 1 is a partial cutaway perspective view of an embodiment of the speed reducer according to the present invention.
Figure 2:
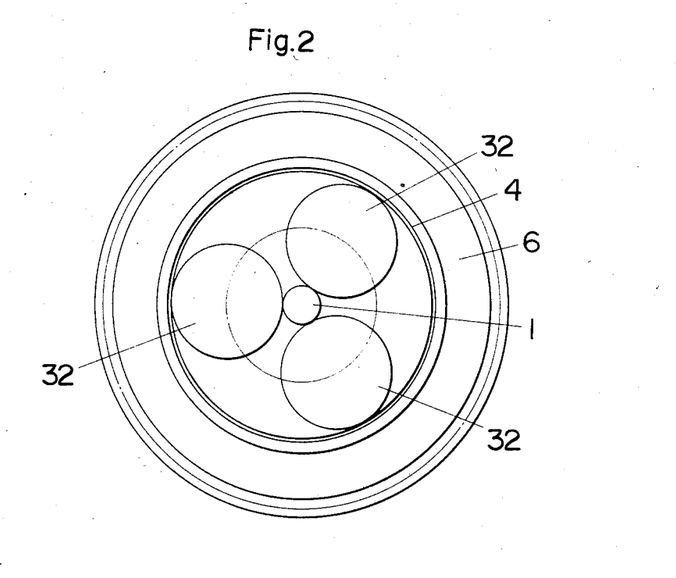
FIG. 2 is a horizontal sectional view of the speed reducer embodiment shown in FIG. 1.
Figure 3:
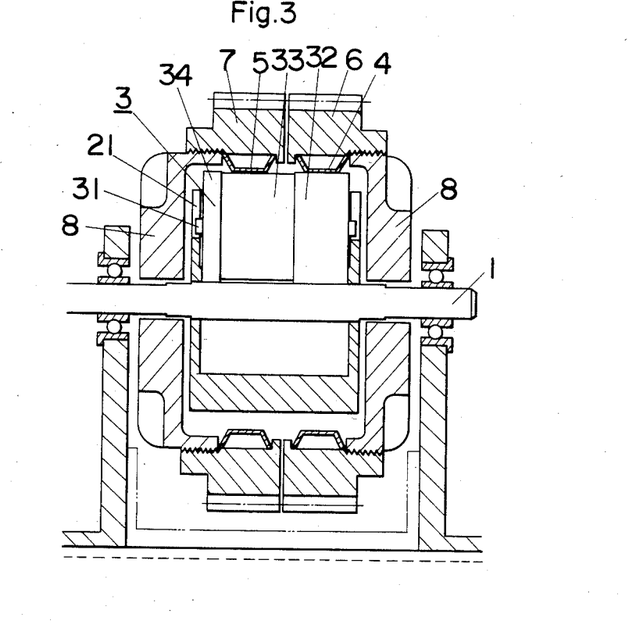
FIG. 3 is a longitudinal sectional view of the speed reducer shown in FIG. 1.
Figure 4A:
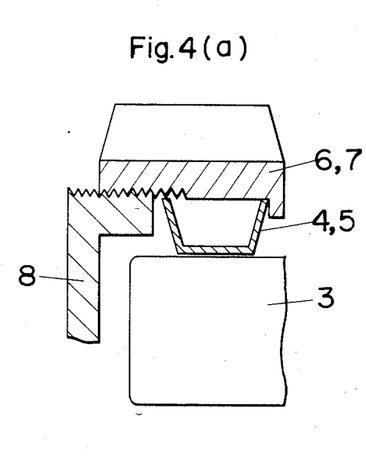
FIGS. 4a and 4b are partial sectional views of the speed reducer shown in FIG. 1.
Figure 4B:
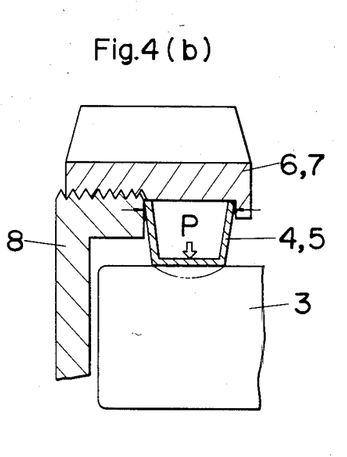

Since rollers 32 and 34 have diameters equivalent to each other and larger than that of roller 33, rollers 32 and 34, which are on both axial sides of roller 33, press against input shaft 1. As a result of this pressing contact, the shafts of the planetary roller 3 and the input shaft 1 stay parallel to each other so that rollers 33 rotate smoothly and do not tilt. The whole speed reducer unit is rotatably supported in a cantilever fashion or journaled at both axial ends, as shown in FIG. 3.

Figure 5:
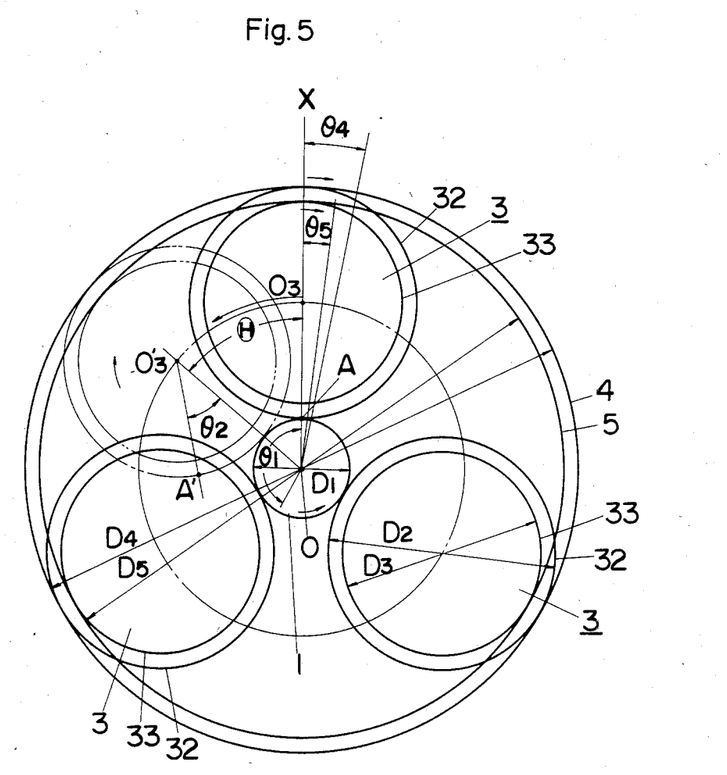
FIG. 5 is an explanatory view of the operation of the speed reducer shown in FIG. 1.
Figure 6:
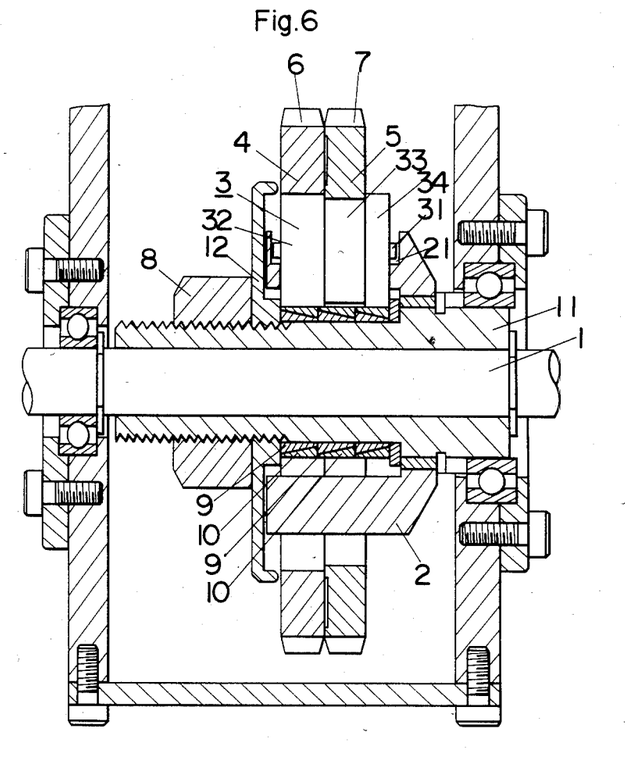
FIG. 6 is a longitudinal sectional view of another speed reducer embodiment according to the present invention.
Figures 7A, 7B:
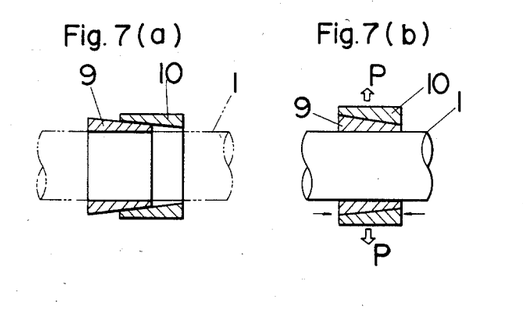
FIGS. 7a and 7b are partial sectional views of the speed reducer shown in FIG. 6.

FIGS. 6 and 7 show a modified embodiment of the speed reducer in accordance with the present invention. In this speed reducer, a pressing means is provided between input shaft 1 and planetary rollers 3, which applies pressure between input shaft 1 and roller 32, roller 32 and output ring 4, and roller 33 and output ring 5. The pressing means comprises a plurality of paired tapered rings 9 and 10. Each of the paired rings are disposed so that the tapered surfaces are laid upon each other in overlapping relationship while, each pair of rings are disposed side by side along the axis of the speed reducer. The tapered rings 9 and 10 are interposed between planetary rollers 3 and the outer periphery of a tubular shaft 11 fixed to the outer periphery of input shaft 1. When each of the control elements 8 are screwed together with tubular shaft 11, axial pressure is applied to tapered rings 9 and 10 through collar 12 which causes the diameters of these rings to enlarge and generate contact pressure P. Unlike the embodiment of FIGS. 1-4, the speed reducer of FIG. 6 is modified so that output rings 4 and 5 are integral with output connection rings 6 and 7. In accordance with this embodiment, output ring 4 or 5 is fixed so that it is non-rotatable while the other output ring imparts rotation in the larger reduction gear ratio so that a differential output results. The operation of the speed reducer of the present invention is explained in FIG. 5, wherein the diameters of output shaft 1, roller 32, roller 33, the inner part of output ring 4, and the inner portion of output ring 5 are represented by $D_1$, $D_2$, $D_3$, $D_4$, and $D_5$, respectively. The absolute axis of the transducer is represented by line X which passes through the center O of input shaft 1. When rollers 32 and 33 of planetary roller 3 are positioned so that their center $O_3$ is on absolute axis X, and point A contacts the outer periphery of input shaft 1, input shaft 1 rotates at an angle of $\theta_1$ so that the planetary roller 3 moves to a position shown by the dotted lines in FIG. 5. In other words, the center $O_3$ moves to a point $O_3'$ and the point A moves to a point $A'$. When planetary roller 3 moves in this manner, the angle of revolution of planetary roller 3, $\Theta$, is defined by the angle of $<O_3OO_3'$ while, the angle $\theta_2$ through which planetary roller 3 rotates is defined by the angle $<OO_3'A'$. When output rings 4 and 5 rotate through angles of $\theta_4$ and $\theta_5$ respectively due to their contact with planetary roller 3, each contact is asssumed to be a rolling transfer without sliding. The rolling contact distance of input shaft 1 with roller 32 is equal to the distance around the roller 32 with input shaft 1.

The physical relationship of the components in the speed reducer are defined by the following equations:

$$(\theta_1-\Theta)D_1/2 = \theta_2 D_2/2$$

$$(\theta_1-\Theta)D_1 = \theta_2 D_2$$

The combination of these equations indicates that $$\Theta = \theta_1 - \theta_2 D_2/D_1 \qquad (i)$$

If the output rings 4 and 5 are dragged so that they rotate rollers 32 and 33 through an angle of revolution $\Theta$ while, shaft 1 simultaneously rotates in the reverse direction so that rollers 32 and 33 rotate through an angle $\theta_2$, the following equations are appropriate:

$$\theta_4 D_4/2 = -\Theta D_4/2 + \theta_2 D_2/2$$

$$\theta_5 D_5/2 = -\Theta D_5/2 + \theta_2 D_3/2$$

When these equations are solved, the values of $\theta_4$ and $\theta_5$ are as follows:

$$\theta_4 = -\Theta + \theta_2 D_2/D_4 \qquad (ii)$$

$$\theta_5 = -\Theta + \theta_2 D_3/D_5 \qquad (iii)$$

If equation (iii) is subtracted from equation (ii), the following equation is obtained:

$$\theta_4 - \theta_5 = \theta_2(D_2/D_4 - D_3/D_5) \text{ is obtained.}$$

When the above equation is solved for $\theta_2$, the following equation results:

$$\theta_2 = \frac{\theta_4 - \theta_5}{D_2/D_4 - D_3/D_5} \qquad (iv)$$

Substituting equation (i) into equation (ii) and solving for $\theta_4$ results in the following equations:

$$\theta_4 = -(\theta_1 - \theta_2 D_2/D_1) + \theta_2 D_2/D_4$$

$$\theta_4 = -\theta_1 + (D_2/D_1 + D_2/D_4)\theta_2$$

Substituting equation (iv) into the above equation results in the following:

$$\theta_4 = -\theta_1 + \frac{(D_2/D_1 + D_2/D_4)(\theta_4 - \theta_5)}{D_2/D_4 - D_3/D_5} \qquad (v)$$

When the output ring 4 is fixed so that it is non-rotatable, $\theta_4 = 0$ equation (v) is solved as follows:

$$0 = -\theta_1 - \frac{(D_2/D_1 + D_2/D_4)\theta_5}{D_2/D_4 - D_3/D_5} \qquad (vi)$$

$$\theta_5 = -\frac{D_2/D_4 - D_3/D_5}{D_2/D_1 + D_2/D_4} \theta_1$$

When the output ring 5 is fixed so that it is non-rotatable, $\theta_5 = 0$ and the equation (v) is rearranged and solved as follows:

$$\theta_4 = -\theta_1 + \frac{D_2/D_1 + D_2/D_4}{D_2/D_4 - D_3/D_5} \theta_4 \qquad (vii)$$

$$\theta_1 = \left(\frac{D_2/D_1 + D_2/D_4}{D_2/D_4 - D_3/D_5} - 1\right)\theta_4$$

-continued $$= \frac{D_2/D_1 + D_3/D_5}{D_2/D_4 - D_3/D_5} \theta_4$$

$$\theta_4 = \frac{D_2/D_4 - D_3/D_5}{D_2/D_1 - D_3/D_5} \theta_1$$

When the input shaft 1 rotates at a constant speed, rotary angles $\theta_1$, $\theta_4$, and $\theta_5$ each represent the rotary angle per unit time (i.e., the angular velocity), whereby the equations (vi) and (vii) represent the velocity ratios of the output rings 4 and 5 respectively, with respect to input shaft 1. As seen from both the equations (vi) and (vii), a differential rotation, from a difference between the diameters $D_2$ and $D_3$ of rollers 32 and 33 and from a difference between the inner diameters $D_4$ and $D_5$, of output ring 4 or 5 results and this causes an extremely large reduction gear ratio. Also, both the rollers 32 and 34 and output rings 4 and 5 have a different reduction gear ratio from one another, whereby different outputs of large reduction gear ratios can be selected. Alternatively, three or more rollers of different diameters may be positioned in the output rings and any one of the output rings may be fixed to enable a plurality of other output rings to each impart a rotation corresponding to a different reduction gear ratio.

Figure 8:
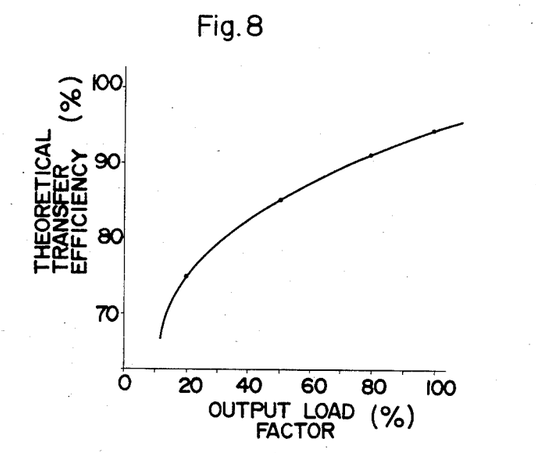
FIG. 8 is a a graph showing the characteristic power transfer efficiency of speed reducers built in accordance with the present invention.

The power transfer efficiency of the present invention will now be explained. The speed reducer of the present invention transfers power through the rolling transmission and this rolling transmission, which is called a friction drive and a traction drive, presses against rollers or balls, which is called the preliminary rolling pressure, thereby transferring power through the rollers or balls without sliding. Since the efficiency of the speed reducer depends largely on the friction of the roller or ball, the sliding friction factor and traction factor of the lubricating oil (i.e., the sliding friction factor of the lubricating oil) determine the contact pressure needed to produce a particular output torque. In addition, the total contact pressure applied to the rollers and the sliding friction factor dictate the no-load loss torque applied to the input shaft. FIG. 8 shows the theoretical output transfer efficiency of the present invention when the reduction gear ratio is 1 to 65. From this graph, it is apparent that the speed reducer of the present invention has an excellent output transfer efficiency.

Figure 9:
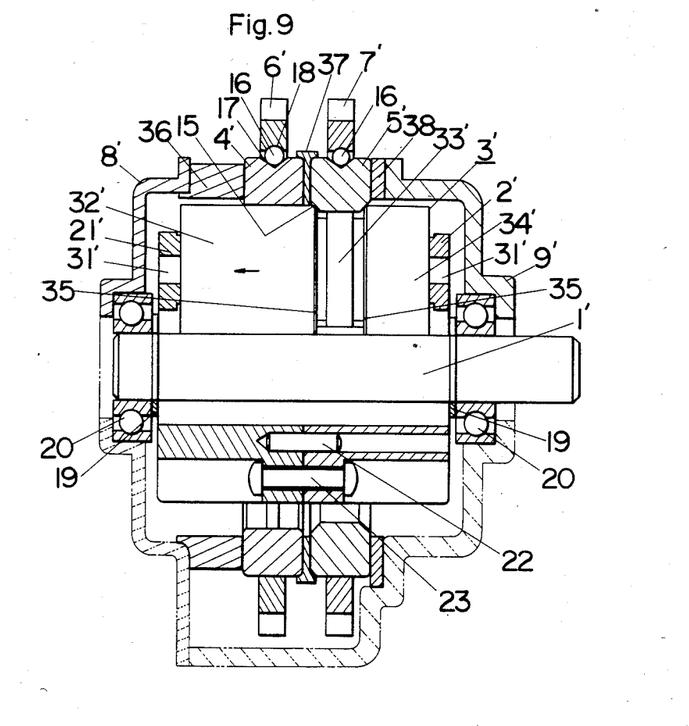
FIG. 9 is a longitudinal sectional view of another embodiment of a speed reducer in accordance with the present invention.
Figure 10:
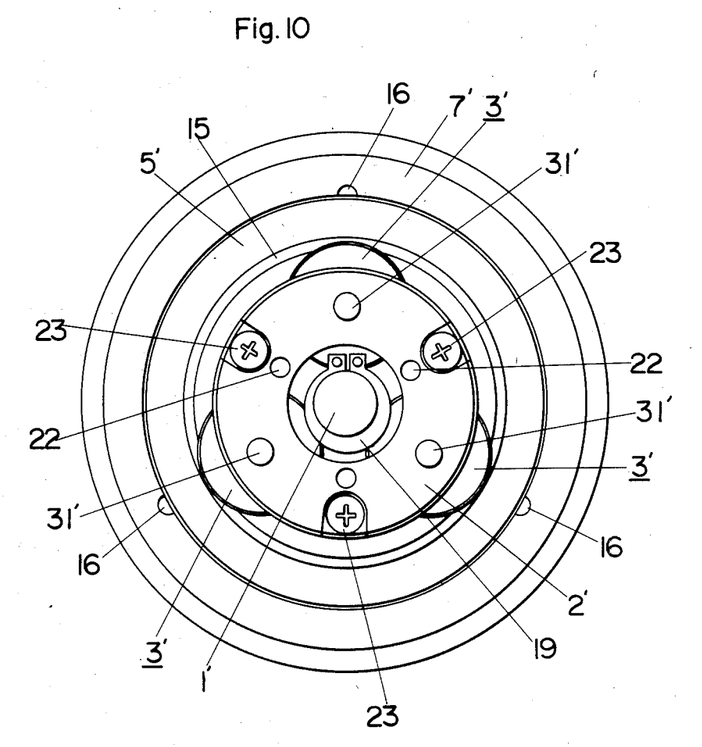
FIG. 10 is a right-hand side view of the speed reducer shown in FIG. 9, from which the housings have been removed.
Figure 11:
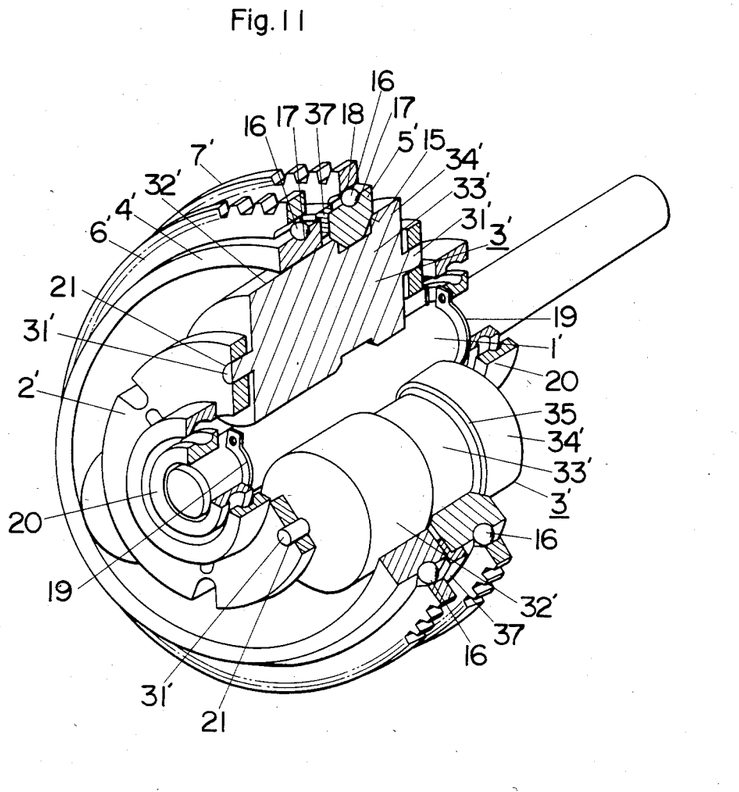
FIG. 11 is a partial cutaway perspective view of the speed reducer shown in FIG. 9, from which the housings are removed.

FIGS. 9-11 show another embodiment of a speed reducer in accordance with the present invention. This speed reducer is constructed so that the output rings are shrink-fitted to the input shaft, whereby the output rings, the planetary rollers, and the input shaft are subjected to a strong contact pressure. A pair of housings are disposed opposite the axial ends of each planetary roller, whereby the housing is provided with rotary guide faces through which the rotating output rings are guided in sliding contact with the housings. The respective planetary rollers are provided at their outer peripheries with an annular groove into which the inner periphery of one output ring is fitted. Using such a construction, the rotary guide faces of the housings will guide the output rings so that skewing of the planetary rollers is prevented.

As shown in detail in FIGS. 9-11, each planetary roller 3' is divided by an annular groove into rollers 32' and 34', which have an equal diameter, and a roller 33', which is located between rollers 32' and 34' and has an outer periphery adjacent to the bottom of the annular groove. The outer periphery of roller 32' contacts the outer periphery of input shaft 1' and the inner periphery of output ring 4' while, the outer periphery of roller 34' contacts the outer periphery of input shaft 1' and the outer periphery of roller 33' contacts the inner periphery of output ring 5'. The inner diameter of output ring 5' is smaller than that of output ring 4' while, roller 33' has a smaller diameter than rollers 32' and 34'. The shoulders at one axial end of rollers 32' and 34' and in turn, the edges of the annular groove at each planetary roller 3' have tapered faces 35 throughout the circumference of rollers 32' and 34'. Both inner side edges 15 of output ring 5' are tapered where they correspond to the tapered faces 35.

Output connection rings 6' and 7', having teeth on their outer peripheries, are disposed around the outer peripheries of output rings 4' and 5' respectively, whereby connection rings 6' and 7' rotate integrally with output rings 4' and 5' respectively. This rotation occurs because output rings 4' and 5' have spot facings 17 adjacent their outer peripheries while, output connection rings 6' and 7' have recesses 18 along their inner peripheries. Steel balls 16 are interposed between the spot facings 17 and the recesses 18 and each ball is fixed to recess 18 by caulk at the edge of the recess. A washer 37, which is molded from a synthetic resin and has a small friction factor, is axially disposed between output rings 4' and 5'. C-shaped snap rings 19 are mounted on input shaft 1' at the axial ends of each planetary roller 3' axially inside of roller bearings 20. Carrier 2' is composed of two similarly shaped halves which are held in position by positioning pin 22 and caulked together with pin 23 as shown in FIGS. 9 and 11.

This mechanism block is provided within a pair of housings 8' and 9', as shown in FIG. 9. Housing 8' holds one roller bearing 20 and fixedly supports washer 36 which serves as the above-mentioned rotary guide face for output ring 4'. Housing 9' holds the other rolling bearing 20 and fixedly supports washer 38 which serves as the rotary guide face for output ring 5'. Washers 36 and 38, which are each formed of a molded synthetic resin having a small friction factor, slidably contact the axial end faces of output rings 4' and 5' respectively, whereby the washers support the output rings against any thrust. In addition, both housings 8' and 9' are completely fixed against thrust by screws.

In the planetary speed reducer described above, the output rings 4' and 5' are shrink fitted so that they press strongly against each planetary roller 3' so that the planetary roller 3' is pushed against input shaft 1'. This arrangement prevents any slippage at contacting portions of the speed reducer and permits the transfer of torque through a lubricating oil. One of the output rings 4' and 5' is fixed so that it does not rotate, whereby the rotation of input shaft 1' is converted to a differential rotation output corresponding to a large reduction gear ratio. In fact, input shaft 1' cylindrically contacts rollers 32' and 34' in an uneven fashion so that skewing inevitably occurs due to the strong pressing contact of the output rings 4' and 5' and the output torque taken from one of the output rings 4' or 5'. This skewing, which occurs whether output ring 4' or 5' generates a torque or even when input shaft 1' is reversibly rotated, moves the planetary roller 3' in the direction of the arrow in FIG. 9. Washer 36 at the rotary guide face of housing 8' moves output ring 5' into position in conjunction with output ring 4' and washer 37. In this position, the tapered face 15 of output ring 5' engages the tapered face 35 at the open edge of the groove in planetary roller 3' so that planetary roller 3' does not move in the direction of the arrow in FIG. 9. When output ring 5' is moved as described above, any reverse reaction movement of input shaft 1' is prevented by the rolling bearings 20 and snap rings 19.

With this arrangement, the loss of torque caused by friction from the sliding contact of washers 36, 37, or 38 with both the axial surfaces of output rings 4' or 5' is very small with regard to the input shaft 1. This efficient operation results because output rings 4' and 5' rotate at a greatly reduced speed in comparison with input shaft 1 and because washers 36, 37, and 38 have a very small friction factor. From the above, it is apparent that planetary carrier 2' is not subjected to any thrust. Also, output ring 5' and the groove of each planetary roller 3' have tapered faces 15 and 35 respectively, whereby the friction loss between output ring 5' and the planetary roller 3' is small so that the latter rotates smoothly. This smooth rotation is due to the differential sliding generated at the tapered faces for purposes of avoiding thrust.

The output torque from either of output rings 4' or 5' is transmitted to other mechanisms through output connection rings 6' and 7'. This torque transfer is accomplished through steel balls 16 which are interposed between spot facings 17 and recesses 18. When output rings 4' and 5' are fixed to output connection rings 6' and 7' in accordance with this embodiment, the transferrable torque is limited but is nevertheless, very large.

Alternatively, the output rings 4' and 5' may be directly guided by the end faces of housings 8' and 9' instead of by washers 36 and 38. In this case, output rings 4' and 5', having a reduced speed, are guided to prevent the skewing of planetary rollers 3' so that the planetary rollers rotate smoothly without using a sliding friction reducing member or creating rolling friction. For differential deceleration devices, planetary rollers of different diameters are positioned in the output rings so that the planetary rollers can be fixed to either of the output rings. This arrangement makes it possible to achieve different outputs in the reduction gear ratio using one of the different output rings. In either case, the rolling transfer of torque by friction or traction drive greatly improves the efficiency of power transfer despite a small loss of torque resulting from the construction of the present invention which prevents skewing.

As described above, this invention fixes one of two output rings within which planetary rollers formed from rollers of different diameters are positioned. The planetary rollers integrally rotate and revolve so that the other output ring turns by virtue of the differential motion resulting from the difference between the diameters of the rollers. The speed reducer of the present invention is very compact, less noisy because of the non-sliding, rolling torque transfer at the contact points where the components of the speed reducer are pressed together, operates smoothly without pulsation, and transfers power in a highly efficient manner. The speed reducer of the present invention also functions as a safety device because when a load greater than the allowable output torque is applied to the output ring, the planetary roller starts sliding to prevent the prime mover connected to the input shaft from overloading or stopping. Since the present invention utilizes rolling transfer, the costs of cutting toothed gears is eliminated, making the speed reducer as inexpensive to produce as rolling roller bearings. The use of traction drive in the present invention substantially eliminates metal contact and gives the transducer a semi-permanent life span. Since the differential output is taken from either of a pair of output rings, either of two outputs with large reduction gear ratios can be selected. Furthermore, both of the output rings could be used for moving the same load. Since the reduction gear ratio depends on the difference between the diameters of the rollers in each planetary roller, various reduction gear ratios can be easily set.

We claim:

1. A speed reducer comprising:
   a cylindrical input shaft of substantially uniform diameter along substantially the entire length thereof;
   at least one planet roller surrounding the input shaft to be in rolling contact therewith, said planet roller comprising a plurality of roller sections which are coaxial and have different diameters from each other, the roller section with the largest diameter being in rolling contact with the input shaft to establish a driving connection between the input shaft and the planet roller; and
   a plurality of output rings which are coaxial with the input shaft to surround said planet roller and which are different in inside diameter, each output ring being formed from a spring having a U-shaped cross-section, each of the output rings corresponding to a side roller section, such that each output ring is in rolling contact with its corresponding roller section, said output rings being pressed against said planet roller so that the roller section with the largest diameter presses against said input shaft, each of the output rings being for selective connection to a load to drive it, whereby when one of the output rings is held stationary, any remaining output ring is driven by the input shaft to effect a differential rotary motion due to the differences between the outside diameters of the roller sections and between the inside diameters of the output rings for providing a high reduction ratio.

2. A speed reducer as set forth in claim 1, wherein said first roller section, said second roller section, and said third roller section are integrally formed to constitute the planet roller.

3. A speed reducer comprising:
   a cylindrical input shaft of substantially uniform diameter along substantially the entire length thereof;
   at least one planet roller surrounding the input shaft to be in rolling contact therewith, said planet roller comprising a first roller section, a second roller section and a third roller section which have a common axis parallel with the axis of the input shaft and which are aligned axially with said second roller being disposed between said first and third rollers, said first roller section and said third roller section having substantially equal diameters which are larger than that of the second roller section, such that the first roller section and the third roller section are respectively in rolling contact with the input shaft at axially spaced portions thereof; and
   first and second output rings which are coaxial with the input shaft to surround the planet roller, and which are respectively in rolling contact with the first and second roller sections, whereby the common axis of the planet roller is kept parallel to at least one of an axis of the input shaft and an axis of the output rings during rotary motion, each output ring being formed from a spring having a U-shaped cross-section, said output rings being pressed against said planet roller so that the roller section with the largest diameter presses against said input shaft, each output ring being for selective connection to a load to drive it, whereby when one of the output rings is held stationary, the other output ring is driven by the input shaft to effect a differential rotary motion due to the differences between the outside diameters of the output rings and between the inside diameters of the output rings for providing a high reduction ratio.

4. A speed reducer as set forth in claim 3, wherein said first roller section, said second roller section, and said third roller section are integrally formed to constitute the planet roller.

* * * * *

UNITED STATES PATENT AND TRADEMARK OFFICE
CERTIFICATE OF CORRECTION

PATENT NO. : 4,561,326
DATED : Dec. 31, 1985
INVENTOR(S) : Takafumi Hamabe, et al.

It is certified that error appears in the above—identified patent and that said Letters Patent is hereby corrected as shown below:

Cover page, item [22], filing date should read:

--Aug. 21, 1984--;

Cover page, after item [22], should read:

--[30]   Foreign Application Priority Data

March 2, 1982   [JP]    Japan      33369/1982--

Signed and Sealed this

Twenty-second Day of April 1986

[SEAL]

Attest:

DONALD J. QUIGG

Attesting Officer       Commissioner of Patents and Trademarks